Feb. 10, 1942.   W. J. DELMHORST   2,272,239
DEVICE FOR MEASURING ELECTRICAL RESISTANCE
Filed Sept. 19, 1939
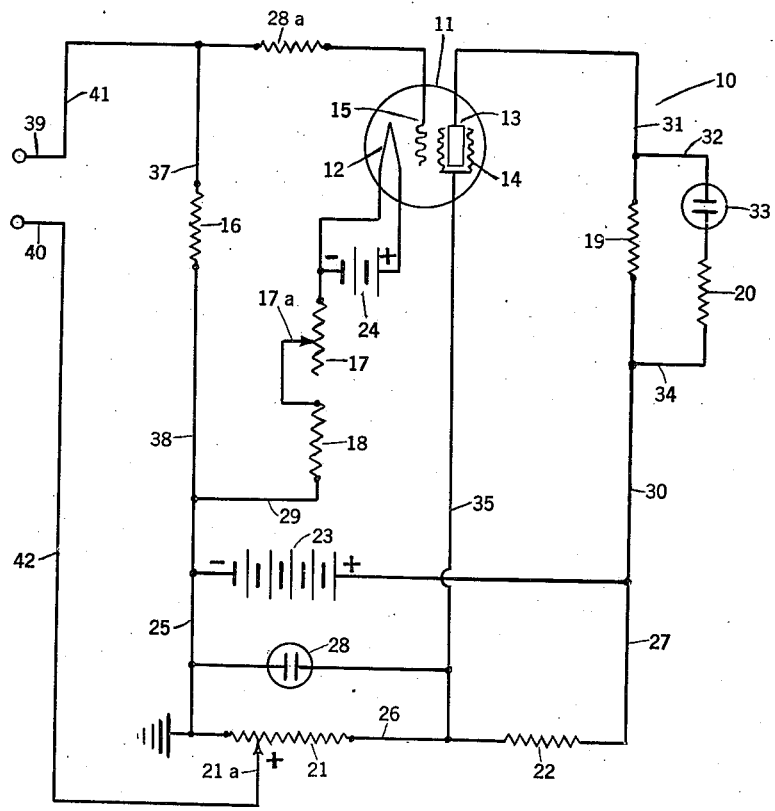
INVENTOR
WILLIAM J. DELMHORST
BY
J.B. Felshin
ATTORNEY Patented Feb. 10, 1942

2,272,239

UNITED STATES PATENT OFFICE 2,272,239

DEVICE FOR MEASURING ELECTRICAL RESISTANCE

William J. Delmhorst, Jersey City, N. J.

Application September 19, 1939, Serial No. 295,572

17 Claims. (Cl. 175—183)

This invention relates to devices for measuring electrical resistance. It is particularly directed to an instrument having a large range for measuring high electrical resistances. When said resistance measuring device is furnished with proper means for making electrical contact with various materials, there is provided a convenient means for measuring physical properties such as moisture content, insulation, leakage, and so forth, which are indicated by the resistance of material under test and varies for different material.

Most prior resistance measuring instruments are of two types; resistance bridges and ohmeters. Either type of instrument requires the use of an electrical meter. Such meters are usually relatively fragile, and are not well adapted for use in instruments which may be subject to more or less severe handling. Furthermore, such instruments are usually expensive.

It is an object of this invention to provide a novel resistance measuring instrument which does not require the use of an electric meter of any type. Said instrument comprises adjustable means to indicate the resistance of the unknown resistance, a neon glow lamp, and means to ignite the glow lamp when the indicating means is adjusted to indicate the value of the unknown resistance.

It is a further object of this invention to provide a resistance measuring device which is extremely simple in construction, requiring only very inexpensive parts, and which can be readily assembled into a light, compact instrument suitable for severe service, and yet be accurate and dependable in use.

Other objects of this invention will in part be obvious and in part hereinafter be pointed out.

The invention accordingly consists in the features of construction, combinations of elements, and arrangement of parts which will be exemplified in the construction hereinafter described, and of which the scope of application will be indicated in the following claims.

In the accompanying drawing:

The single figure of the drawing illustrates the electrical circuit embodied in the invention.

Referring now in detail to the single figure of the drawing, there is illustrated a resistance measuring circuit 10, embodying the invention. Said circuit comprises a screen grid thermionic emission vacuum tube 11, having a filamentary cathode 12, a plate anode 13, a screen grid 14, and a control grid 15. It is well known that in a thermionic tube of the character described, when the filament is heated and a positive potential applied to the plate, a thermionic emission current will flow between the filament and the plate. It is further known that the magnitude of said current can be controlled by the control grid. When the grid potential is negative with respect to the filament, the current flowing to the anode is very small, and as the grid voltage becomes positive, the anode current is increased therewith. Use is made of these properties of the tube 11 to measure electrical resistances, as will hereinafter be described.

The power supply for the circuit is obtained from the batteries 23 and 24. Battery 24 is connected directly across the filament 12, and is used to supply heating current for said filament. Battery 23 supplies the plate voltage for the vacuum tube 11, as will be shown hereinafter.

Connected in series circuit across the terminals of battery 23, are two resistors 21 and 22. Resistor 21 has an adjustable tap 21a. Said resistor 21 has one end connected by wire 25 to the negative terminal of battery 23, and has its other end connected by wire 26 to resistor 22. The other end of said resistor 22 is connected by wire 27 to the positive battery terminal. The negative terminal of battery 23 may be connected to ground.

Connected in parallel with the adjustable resistor 21, is a neon glow tube 28, acting as a voltage regulator tube. Neon glow tubes are old to the art, and are constructed to ionize and become ignited when a predetermined voltage is applied to the tube terminals. Furthermore, neon glow tubes possess the property, that, after ignition, the voltage across the tube terminals drops somewhat, and then remains constant, the tube automatically adjusting its internal resistance to draw more or less current as may be necessary to maintain said constant voltage. It is therefore seen that the voltage across resistor 21 will be maintained at a constant value, by neon tube 29, which is always ignited because it is connected across the battery, and said battery has sufficient voltage to ignite the tube.

The anode circuit for the vacuum tube 11 comprises an adjustable resistor 17, and fixed resistors 18 and 19. Resistor 17 has one end thereof connected to negative filament supply. Resistor 18 is connected at one end to the adjustable tap 17a of resistor 17, and at the other end is connected by wire 29 to the negative terminal of battery 23. The positive terminal of battery 23 is connected by wire 30 to resistor 19, the other end of said resistor being connected by wire 31 to the plate anode 13 of tube 11. Connected in parallel with resistor 19 is a circuit comprising a neon glow lamp 33, similar to lamp 28, and a resistor 20, connected in series with said lamp for limiting the current therein. Lamp 33 is connected by wire 32 to one end of resistor 19, the other end of said lamp being connected to resistor 20. The other end of resistor 19 is connected by wire 34 to the resistor 20.

The screen grid 14 of tube 11 is connected by wire 35 to a point between resistors 21 and 22.

The control grid circuit comprises two resistors 28a and 16. Control grid 15 is connected by wire 36 to resistor 28a. Resistor 28a is connected by wire 37 to resistor 16. Resistor 16 is connected by wire 38 to the negative terminal of battery 23.

There are further provided a pair of electrical contact prongs, probes or terminals 39, 40 across which the unknown resistance to be measured is connected. Terminal 39 is connected by wire 41 to resistor 28a. Terminal 40 is connected by wire 42 to the adjustable tap 21a on resistor 21.

The operation of the device will now be described:

As heretofore explained, since the plate 13 is maintained at a positive potential with respect to the filament 12, a thermionic emission current will flow through the tube 11, through a circuit traceable from the positive terminal of battery 23, wire 30, resistor 19, wire 31, plate 13, filament 12, resistor 17, resistor 18, wire 29 to the negative terminal of battery 23. Due to the voltage drop in resistors 17 and 18, it is seen that the filament 12 will be at a positive potential with respect to the ground.

Assume that the adjustable contact 21a is at the extreme left of resistor 21, and terminals 39, 40 are open-circuited. Since the control grid 15 carries practically no current, there will be no voltage drop in the resistors 16 and 28a, and the control grid will be at substantially ground potential. Since, as explained above, the filament 12 is slightly positive with respect to ground, it is seen that the control grid is negative with respect to the filament. The anode current will consequently be small, and the voltage drop across resistor 19 will not be sufficiently high to ignite the indicator lamp 33.

Now, assume that the terminals 39, 40 are brought into electrical contact with each other, and the contact 21a is moved slightly to the right. A portion of the voltage of the potentiometer 21 will then be used to send current through the resistor 16, the complete circuit for said current flow being traceable from the positive terminal of battery 23, wire 27, resistor 22, potentiometer 21, tap 21a, wire 42, terminal 40, terminal 39, wire 41, wire 37, resistor 16, wire 38 to the negative of battery 23. Since a voltage drop now exists across the resistor 16 due to the current flow introduced therein, the control grid 15 is biased to a positive potential with respect to ground by a potential equal to the voltage across said resistor. Consequently, as grid 15 becomes positive, the anode current in the vacuum tube 11 is increased, and the voltage drop across resistor 19 is increased.

With terminals 39, 40 short circuited, as contact 21a is advanced to the right, the grid 15 becomes more and more positive and the voltage across resistor 19 increases, until finally there is sufficient voltage to ignite glow lamp 33. The position of contact 21a which is just sufficient to cause ignition of glow lamp 33 is marked as "zero" on any suitable scale attached to the potentiometer 21.

It will be further understood that, a resistance connected between the terminals 39, 40, instead of said prongs being short circuited, the current in resistor 16 will be decreased by reason of the smaller current flow therein due to the additional resistance inserted between terminals 39, 40 in the grid bias circuit described heretofore. The positive bias of grid 15 is decreased, and the current in resistor 19 is also decreased. Therefore, in order again to increase the voltage across resistor 19 to a sufficient value to ignite glow lamp 33, the adjustable contact 21a must be advanced further to the right, for increasing the bias voltage across resistor 16 to increase the positive bias on grid 15 and increase the plate current of tube 11. Furthermore, the greater the resistance inserted between terminals 39, 40, the more contact 21a will have to be moved to the right to ignite glow lamp 33.

It is therefore clear, that the position of the adjustable contact 21a which will just cause ignition of the glow lamp 33 is dependent on the magnitude of the resistance connected between terminals 39, 40. Furthermore, if the scale attached to the potentiometer 21, were properly calibrated, the value of the resistance could be read directly on the scale. Furthermore, the scales can be calibrated to give values of percentage of moisture for a particular material.

In order to calibrate the scale, it is necessary to determine the zero position as heretofore described. Then several sizes of known resistances can be connected across terminals 39, 40, and the corresponding ignition positions of contact 21a determined by actual test. Their positions may be marked on the scale, and graduations inserted therebetween to make the scale continuous reading. To thereafter determine any unknown resistance, it is only necessary to connect said resistance across the terminals 39, 40, move the contact 21a to the right until lamp 33 ignites, and the value of the unknown resistance may be read directly on the calibrated scale.

If, due to variations of battery voltage, tube ageing characteristics, etc., the zero mark of the calibrated scale should vary slightly from its original calibrated position, adjustment may be made to correct said setting by means of the adjustable resistor 17. The zero position of contact 21a represents the grid bias voltage necessary to ignite glow lamp 33. Any variations in said ignition grid bias voltage may be compensated by introducing a corresponding bias to the filament 12. As heretofore explained, the voltage drop across resistors 17, 18 normally introduce a positive bias in said filament 12. Therefore, by adjusting resistor 17, the filament bias may be changed to compensate for variations in the grid bias required to ignite the indicator lamp 33.

It is seen that the magnitude of the grid bias voltage applied across resistor 16 depends on the ratio of said resistance to the unknown resistance. If, for example, resistor 16 should be very small, and the unknown resistor very large, it may be possible that there will not be sufficient voltage drop across resistor 16 to cause the lamp 33 to ignite, even with contact 21a moved to the extreme right. In such case, the unknown resistor will be out of range of the instrument However, if resistor 16 were increased, a greater percentage of potentiometer voltage would be absorbed across said resistor, so that sufficient bias voltage would be available to ignite lamp 33. Therefore, it is seen that the instrument may be constructed for any desired range, by selecting the appropriate magnitude for resistance 16.

It will be noted that the resistance 20 limits the amount of current that can flow through the lamp 33, thus preventing excess current which might change the breakdown voltage of said lamp. For this reason resistance 20 should be relatively high. The voltage drop across resistance 19 depends on the plate current, and when this current exceeds a definite minimum, lamp 33 will light, indicating the current flow.

It will be noted that the instrument will work without being grounded, as the ground merely places the grounded part of the circuit at ground or zero potential. The resistance 28a is used to limit the flow of current between the control grid 15 and the filament 12.

The series resistance 18 places filament 12 at a minimum potential above ground, and prevents the bias on the filament 12 from being reduced below a minimum value when resistor 17 is adjusted for setting the zero mark on the scale, as heretofore described.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawing is to be interpreted as illustrative and not in a limiting sense.

Having thus described my invention, I claim as new and desire to secure by Letters Patent:

1. In a resistance measuring device, a lamp, a potentiometer, a pair of terminals across which an unknown resistance is connected, a circuit connecting said lamp, potentiometer and terminals, a vacuum tube in said circuit having an anode and a control grid, the lamp being connected in the anode circuit of said tube, means to impose a potential on said control grid to maintain the voltage across said lamp sufficiently low so that said lamp is not illuminated, means controlled by said potentiometer to decrease the grid bias to raise the voltage across the lamp for illuminating said lamp, said means being dependent upon the magnitude of the unknown resistor.

2. In a resistance measuring device, a lamp, a potentiometer, a pair of terminals across which an unknown resistance is connected, a circuit connecting said lamp, potentiometer and terminals, a vacuum tube in said circuit having an anode and a control grid, the lamp being connected in the anode circuit of said tube, the bias on said control grid being normally preset to maintain the voltage across said lamp sufficiently low so that said lamp is not illuminated, means controlled by said potentiometer to decrease the grid bias to raise the voltage across the lamp for illuminating said lamp, said means being dependent upon the magnitude of the unknown resistor, a scale fixed with respect to said potentiometer calibrated for indicating the unknown resistance across said terminals, after the potentiometer is adjusted to illuminate said lamp.

3. In a resistance measuring device, a lamp, a potentiometer, a pair of terminals across which an unknown resistance is connected, a circuit connecting said lamp, potentiometer and terminals, a vacuum tube in said circuit having an anode and a control grid, the lamp being connected in the anode circuit of said tube, the bias on said control grid being normally preset to maintain the voltage across said lamp sufficiently low so that said lamp is not illuminated, means controlled by said potentiometer to decrease the grid bias to raise the voltage across the lamp for illuminating said lamp, said means being dependent upon the magnitude of the unknown resistor, a resistor in series with said lamp to limit the current in said lamp to prevent excess current through said lamp.

4. In a resistance measuring device, a neon glow lamp, a pair of terminals across which an unknown resistor is connected, a potentiometer, a circuit connecting said lamp, potentiometer and terminals, a vacuum tube in said circuit having a plate and a control grid, a resistor connected in the plate circuit of said tube, whereby the voltage drop across said resistor depends on the plate current in said tube, said lamp being connected across said resistor, whereby when the current through said resistor reaches a predetermined value, the lamp will ignite, a bias circuit for said control grid comprising a second resistor connected in series with said terminals, means for supplying current to said potentiometer, said potentiometer being so connected as to supply current to said bias circuit, and said second resistor being so connected as to introduce a bias to said control grid to increase the current in the plate circuit, whereby the grid bias voltage depends upon the adjustment of the potentiometer and the magnitude of the unknown resistor.

5. In a resistance measuring device, a neon glow lamp, a pair of terminals across which an unknown resistor is connected, a potentiometer, a circuit connecting said lamp, potentiometer and terminals, a vacuum tube in said circuit having a plate and a control grid, a resistor connected in the plate circuit of said tube, whereby the voltage drop across said resistor depends on the plate current in said tube, said lamp being connected across said resistor, whereby when the current through said resistor reaches a predetermined value the lamp will ignite, a bias circuit for said control grid comprising a second resistor connected in series with said terminals, means for supplying current to said potentiometer, said potentiometer being so connected as to supply current to said bias circuit, and said second resistor being so connected as to introduce a bias to said control grid to increase the current in the plate circuit, whereby the grid bias voltage depends upon the adjustment of the potentiometer and the magnitude of the unknown resistor, a scale fixed with respect to said potentiometer for indicating the position of the potentiometer required to produce sufficient bias voltage to ignite said lamp, said scale being calibrated to indicate the value of the unknown resistance.

6. In a resistance measuring device, a neon glow lamp, a pair of terminals across which an unknown resistor is connected, a potentiometer, a circuit connecting said lamp, potentiometer and terminals, a vacuum tube in said circuit having a plate and a control grid, a resistor connected in the plate circuit of said tube, whereby the voltage drop across said resistor depends on the plate current in said tube, said lamp being connected across said resistor, whereby when the current through said resistor reaches a predetermined value the lamp will ignite, a bias circuit for said control grid comprising a second resistor connected in series with said terminals, means for supplying current to said potentiometer, said potentiometer being so connected as to supply current to said bias circuit, and said second resistor being so connected as to introduce a bias to said control grid to increase the current in the plate circuit, the control grid being initially biased to keep the current through the first resistor sufficiently low so that the lamp is not illuminated.

7. In a resistance measuring device, a screen grid vacuum tube, a plate circuit for said tube including a battery to supply a current to the circuit, a neon glow lamp in said circuit in series with the plate of said tube, a grid biasing circuit connected across the terminals of said battery, a potentiometer in said last mentioned circuit, a pair of terminals across which an unknown resistor to be measured, may be connected, in said grid biasing circuit, in series with said potentiometer, means for connecting said grid biasing circuit to the grid of said tube, and a resistor in the grid biasing circuit to impose a potential on the grid above the minus terminal of said battery.

8. In a resistance measuring device, a screen grid vacuum tube, a plate circuit for said tube including a battery to supply a current to the circuit, a neon glow lamp in said circuit in series with the plate of said tube, a grid biasing circuit connected across the terminals of said battery, a potentiometer in said last mentioned circuit, a pair of terminals across which an unknown resistor to be measured, may be connected, in said grid biasing circuit, in series with said potentiometer, means for connecting said grid biasing circuit to the grid of said tube, and a resistor in the grid biasing circuit to impose a potential on the grid above the minus terminal of said battery, a second neon glow lamp connected in parallel with the potentiometer to maintain the voltage across the potentiometer.

9. In a resistance measuring device, a screen grid vacuum tube, a plate circuit for said tube including a battery to supply a current to the circuit, a neon glow lamp in said circuit in series with the plate of said tube, a grid biasing circuit connected across the terminals of said battery, a potentiometer in said last mentioned circuit, a pair of terminals across which an unknown resistor to be measured, may be connected, in said grid biasing circuit, in series with said potentiometer, means for connecting said grid biasing circuit to the grid of said tube, a resistor in the grid biasing circuit to impose a potential on the grid above the minus terminal of said battery, a second neon glow lamp connected in parallel with the potentiometer to maintain the voltage across the potentiometer, and means to so connect the screen grid of the tube with the second glow lamp, that the second glow lamp maintains the potential of the screen grid constant.

10. In a resistance measuring device, a screen grid vacuum tube, a plate circuit for said tube including a battery to supply a current to the circuit, a neon glow lamp in said circuit in series with the plate of said tube, a grid biasing circuit connected across the terminals of said battery, a potentiometer in said last mentioned circuit, a pair of terminals across which an unknown resistor to be measured, may be connected, in said grid biasing circuit, in series with said potentiometer, means for connecting said grid biasing circuit to the grid of said tube, a resistor in the grid biasing circuit to impose a potential on the grid above the minus terminal of said battery, a second neon glow lamp connected in parallel with the potentiometer to maintain the voltage across the potentiometer, means to so connect the screen grid of the tube with the second glow lamp, that said second glow lamp maintains the potential of the screen grid constant, and a resistance interposed between the grid and the grid biasing circuit.

11. In a resistance measuring device, a screen grid vacuum tube, a plate circuit for said tube including a battery to supply a current to the circuit, a neon glow lamp in said circuit in series with the plate of said tube, a grid biasing circuit connected across the terminals of said battery, a potentiometer in said last mentioned circuit, a pair of terminals across which an unknown resistor to be measured, may be connected in said grid biasing circuit, in series with said potentiometer, means for connecting said grid biasing circuit to the grid of said tube, a resistor in the grid biasing circuit to impose a potential on the grid above the minus terminal of said battery, a second neon glow lamp connected in parallel with the potentiometer to maintain the voltage across the potentiometer, means to so connect the screen grid of the tube with the second glow lamp, that said second glow lamp maintains the potential of the screen grid constant, a resistance interposed between the grid and the grid biasing circuit, and a resistance in series with the second glow lamp to limit the current through the second glow lamp.

12. In a resistance measuring device, a screen grid vacuum tube, a plate circuit for said tube including a battery to supply a current to the circuit, a neon glow lamp in said circuit in series with the plate of said tube, a rheostat in the plate circuit to vary the potential of the filament of the tube with respect to the minus side of the battery, a grid biasing circuit connected across the terminals of said battery, a potentiometer in said last mentioned circuit, a pair of terminals across which an unknown resistor to be measured, may be connected, in said grid biasing circuit, in series with said potentiometer, means for connecting said grid biasing circuit to the grid of said tube, and a resistor in the grid biasing circuit to impose a potential on the grid above the minus terminal of said battery.

13. In a resistance measuring device, a vacuum tube, a plate circuit for said tube, a neon glow lamp in said circuit, in series with the plate of said tube, a grid biasing circuit, a potentiometer in said last mentioned circuit, a pair of terminals across which an unknown resistor to be measured, may be connected, in said grid biasing circuit, in series with said potentiometer, means for connecting said grid biasing circuit to the grid of said tube, and a resistor in the grid biasing circuit to impose a potential on the grid.

14. In a resistance measuring device, a vacuum tube, a plate circuit for said tube, a neon glow lamp in said circuit, in series with the plate of said tube, a grid biasing circuit, a potentiometer in said last mentioned circuit, a pair of terminals across which an unknown resistor to be measured, may be connected, in said grid biasing circuit, in series with said potentiometer, means for connecting said grid biasing circuit to the grid of said tube, a resistor in the grid biasing circuit to impose a potential on the grid, and a rheostat in the plate circuit to vary the potential of the filament of the tube.

15. In a resistance measuring device, a vacuum tube, a plate circuit for said tube, a neon glow lamp in said circuit, in series with the plate of said tube, a grid biasing circuit, a potentiometer in said last mentioned circuit, a pair of terminals across which an unknown resistor to be measured, may be connected, in said grid biasing circuit, in series with said potentiometer, means for connecting said grid biasing circuit to the grid of said tube, and a resistor in the grid biasing circuit to impose a potential on the grid, the means for connecting the grid to the grid biasing circuit including a resistance interposed between the grid and the grid biasing circuit.

16. In a resistance measuring device, a screen grid vacuum tube, a plate circuit for said tube, a grid biasing circuit, a potentiometer in said last mentioned circuit, a pair of terminals across which an unknown resistor to be measured, may be connected, in said grid biasing circuit, in series with said potentiometer, means for connecting said grid biasing circuit to the grid of said tube, and a resistor in the grid biasing circuit to impose a potential on the grid.

17. In a resistance measuring device, a screen grid vacuum tube, a plate circuit for said tube, a grid biasing circuit, a potentiometer in said last mentioned circuit, a pair of terminals across which an unknown resistor to be measured, may be connected, in said grid biasing circuit, in series with said potentiometer, means for connecting said grid biasing circuit to the grid of said tube, a resistor in the grid biasing circuit to impose a potential on the body, a second neon glow lamp connected in parallel with the potentiometer to maintain the voltage across the potentiometer, and means to so connect the screen grid of the tube with the second glow lamp, that said second glow lamp maintains the potential of the screen grid constant.

WILLIAM J. DELMHORST.